United States Patent [19]
Kushida

[11] Patent Number: 6,018,244
[45] Date of Patent: Jan. 25, 2000

[54] METHOD FOR DETECTING DIASTROPHISM BY DETECTING VHF RADIO WAVES REFLECTED BY THE IONOSPHERE

[76] Inventor: Yoshio Kushida, 8697-1, Yata-aza Namikiue, Oizumi-mura, Kitakoma-gun,Yamanashi 409-15, Japan

[21] Appl. No.: 08/930,164
[22] PCT Filed: Apr. 5, 1996
[86] PCT No.: PCT/JP96/00933
  § 371 Date: Dec. 3, 1997
  § 102(e) Date: Dec. 3, 1997
[87] PCT Pub. No.: WO96/31789
  PCT Pub. Date: Oct. 10, 1996

[30] Foreign Application Priority Data

Apr. 7, 1995 [JP] Japan .................................... 7-108320

[51] Int. Cl.$^7$ .............................. G01V 3/12; G01V 1/00; G01V 11/00; G01S 13/88
[52] U.S. Cl. .......................... 324/323; 324/334; 324/344; 324/72; 340/690
[58] Field of Search ..................... 324/72, 323, 334–337, 324/344–349; 340/601, 690; 342/459; 455/155.1, 157.1

[56] References Cited

U.S. PATENT DOCUMENTS 4,554,546  11/1985  Herbreteau et al. .
4,724,390   2/1988  Rauscher et al. ........................ 324/344
5,148,110   9/1992  Helms ................................. 324/344 X
5,811,974   9/1998  Hata ..................................... 324/344

OTHER PUBLICATIONS

Unusual Change In Meteor Observation Data Before Earthquake, Diastrophism Affects Ionosphere, Yamanashi Nichi–Nichi Shinbun (Yamanashi Nichi–Nichi Newspapers), Feb. 25, 1995.

FM Propagation Abnormality Before And After Earthquake Disaster, Yomiuri Shinbun (Yomiuri Newspapers), Feb. 26, 1995.

Gokhberg et al; "Study of Seismic Influence . . . of the Earth–Ionosphere Waveguide", Physics of the Earth and Planetary Interiors, vol. 51, No. ½ (1989) pp. 64–67.

*Primary Examiner*—Gerard Strecker
*Attorney, Agent, or Firm*—Steinberg & Raskin, P.C.

[57] ABSTRACT

A diastrophism detection method and an apparatus therefor are provided which is capable of predicting a position of occurrence of diastrophism such as an earthquake or the like, a scale thereof, time thereof and the like with increased accuracy without being affected by various artificial and natural noises and being effectively put to practice utilizing a simple and objective judgment procedure and by means of equipments simplified in structure and reduced in cost. A VHF radio wave beyond a line-of-sight distance through a plasma density distribution abnormality zone temporarily formed in the ionosphere during diastrophism such as an earthquake or the like is detected in the form of abnormal propagation, resulting in a position of diastrophism below the plasma density distribution abnormality zone, a scale thereof, time thereof and the like being judged.

10 Claims, 12 Drawing Sheets

1995

1995

METHOD FOR DETECTING DIASTROPHISM BY DETECTING VHF RADIO WAVES REFLECTED BY THE IONOSPHERE

FIELD OF THE INVENTION

This invention relates to a method for detecting diastrophism and an apparatus therefor, and more particularly to a method for judging occurrence of large-scale diastrophism such as, for example, an earthquake by detecting a change of the ionosphere in the upper atmosphere caused by an electrostatic induction action of a charge cluster generated on the ground surface near the diastrophism or by an electromagnetic wave or the like discharged from a crust.

BACKGROUND OF THE INVENTION

Conventionally, it is known that during large-scale diastrophism such as an earthquake, a volcanic eruption or the like, compressive force between stratum and/or a pressure of magma are gradually increased, so that a piezoelectric effect occurs due to a highly increased pressure in a crust immediately before occurrence of the earthquake or volcanic eruption, or a strong electromagnetic wave, heavy earth current, strong electrostatic action or the like occurs due to a chemical phenomenon, an electrokinetic phenomenon or the like.

Under such a circumstance, various means such as measurement of distortion/deformation of a crust, detection of a variation in electromagnetic wave/earth current generated from a crust as a symptom of an earthquake and the like are attempted in order to predict occurrence of an earthquake.

With regard to an electromagnetic wave emitted from a crust, it is known that an electromagnetic wave and an earth current are discharged from a region near a seismic center or hypocenter due to a compressive pressure and/or a frictional pressure abnormally increased near a place of a dislocation and due to exo-electrons generated by breakage of a base rock.

As a method for detecting a variation in electromagnetic wave or magnetic force line to predict an earthquake, it is proposed that a cloud chamber having transpired gas such as ether or the like encapsulated therein is arranged in an artificial satellite to visually observe or photograph a portion of the gas linearly whitened due to passage of an electromagnetic wave (corpuscular ray) or a magnetic force line discharged from an interior of the ground therethrough (Japanese Patent Application Laid-Open Publication No. 133174/1979, Japanese Patent Application Laid-Open Publication No. 103388/1979 and Japanese Patent Application Laid-Open Publication No. 13802/1980).

Also, it is proposed that a plurality of electrodes are embedded in the ground to electrically detect a specific variation in earth current immediately before an earthquake, to thereby predict occurrence of the earthquake (Japanese Patent Application Laid-Open Publication No. 37580/1983).

The former method proposed is carried out by visual observation or photograph observation, to thereby cause many mistakes and errors in judgment of a direction of a hypocenter, a scale of an earthquake and the like and lack objectivity. Also, it has another disadvantage of failing in discrimination between prediction of actual occurrence of an earthquake and malfunction of the device due to affection of various noise electromagnetic waves depending on an environment in which the device is arranged. In particular, it fails to exhibit satisfactory utility in modern cities or towns in which large-sized engines for airplanes, vehicles and the like are driven and electric machines and electronic equipments are crowded, environs thereof, industrial areas and the like.

Also, the above-described method of mounting the electromagnetic sensor in the artificial satellite substantially fails to specify a position of occurrence of diastrophism, a scale thereof and time thereof because the satellite is excessively remote from diastrophism, even when the sensor has a capability of capturing an electromagnetic wave. Also, it causes an excessive increase in cost for launching of the satellite and cost for control, communication and maintenance, to thereby lack utility from an economical point of view.

Further, the latter method proposed is adapted to carry out electrical detection and electronic information processing, to thereby be superior in objectivity to the former method. Nevertheless, it likewise causes undesired introduction of many complicated noises into the electrodes in modern cities or towns in which a number of electrodes for equipments consuming a large amount of electric power are embedded, environs thereof, industrial areas and the like, to thereby substantially fail in judgment, resulting in failing to be put to practical use.

The inventor has carried out an astronomical observation for many years in his own astronomical observatory. In particular, he has continuously carried out a meteor observation using a VHF radio wave generated from an FM broadcasting station remote sufficiently to cause a failure in receiving of a direct wave, wherein an abnormal reflection phenomenon of a VHF radio wave (abnormal propagation of a VHF radio wave (frequency modulation or the like)) due to formation of an ionospheric column in the upper atmosphere owing to inrush of meteor into the atmosphere is observed or an FM broadcasting radio wave in which abnormal propagation occurred is received to analyze data thereon, to thereby observe the meteor.

In the course of the meteor observation, the inventor found a continuous abnormal propagation phenomenon continuing over several hours to three days and, in a long case, four to six days rather than a temporary VHF abnormal propagation phenomenon as short as less than one second due to meteor inrush and, as a result, took notice of relationship between the abnormal receive data and occurrence of diastrophism such as an earthquake or the like.

The inventor made analysis and research of data on an abnormal propagation phenomenon of a VHF radio wave and earthquake information before and after occurrence of the phenomenon over about two years. As a result, it was proved that occurrence of the abnormal propagation phenomenon fully coincides with information of an earthquake occurring between the FM broadcasting station and a receiving point and properties of the receive data are fully correlated to a scale of the earthquake, as well as formation and extinguishing thereof.

OBJECTS AND SUMMARY OF THE INVENTION

The present invention has been made so as to solve the problems of the prior art while taking notice of the fact described above. An object of the present invention is to provide a diastrophism detection method and an apparatus therefor which are capable of predicting a position of occurrence of diastrophism such as an earthquake or the like, a scale thereof, time thereof and the like with increased accuracy without being affected by various artificial and natural noises and capable of being effectively put to practice according to a simplified and objective judgment procedure and by means of equipments simplified in structure and reduced in cost.

In accordance with the present invention, a method for detecting diastrophism is provided which comprises the step of detecting a variation in plasma density occurring in the ionosphere during diastrophism such as earthquake or the like in the form of abnormal propagation of a VHF radio wave beyond a line-of-sight distance, to thereby judge a position of the diastrophism below a plasma density distribution abnormality zone, a scale thereof, time thereof and the like. Also, in accordance with the present invention, an apparatus for detecting diastrophism, which comprises a receiving unit for a VHF radio wave including a center tuning circuit and an output unit connected to the center tuning circuit, wherein a variation in plasma density distribution in the ionosphere caused due to an electromagnetic phenomenon occurring during diastrophism is received in the form of abnormal propagation of a VHF radio wave utilizing very feeble reflection of the VHF radio wave beyond a line-of-sight distance, to thereby permit occurrence of diastrophism below a plasma density distribution abnormality zone to be detected.

In the upper atmosphere, the ionosphere always exists as a product in the natural world, wherein free electrons and ions are scattered. Of radio waves generated in the atmosphere, only a long wave is satisfactorily reflected on the ionosphere, to thereby be propagated to a place remote by a distance as long as hundreds of kilometers to thousands of kilometers. However, a microwave belonging to a VHF band or a UHF band substantially penetrates through the ionosphere, so that it is usually impossible to receive the microwave through reflection on the ionosphere. Also, the surface of the earth is spherical, so that a place far by a distance as long as 100 to 150 km or more fails to receive a direct wave even when it has a flat ground configuration.

More particularly, a place remote by a distance sufficient not to permit it to receive a direct wave of a VHF radio wave fails to receive the direct wave as a normal signal carrier, although it possibly receives a slight amount of direct wave formed by a slight diffraction action in the atmosphere or a slight amount of reflected wave formed by reflection on the ordinary ionosphere constantly existing.

Under such VHF radio wave propagation circumstances, a variation in environment in the atmosphere such as any meteorological change does not cause a substantial variation in diffraction action of a radio wave, so that a factor which causes a substantial variation in receiving conditions is exactly abnormal propagation (frequency modulation or the like) of a VHF radio wave by a change in construction of the ionosphere in the upper atmosphere or properties thereof, namely, occurrence of a plasma density variation (distribution abnormality) in the ionosphere.

Construction of the ionosphere and properties thereof are not constant even in a normal state and would be varied with time by affection of solar activity or a factor such as incoming of a large amount of energy particles from the cosmos or the like. It occurs as a change within a range as large as a global scale and does not appear in the form of a spot-like abnormal reflection layer (plasma density distribution abnormality zone) of a scale as large as tens of kilometers to hundreds of kilometers in diameter.

A study by the inventor elucidated a receiving mechanism that in connection with abnormal receiving of a VHF radio wave from a place remote sufficiently to fail to receive a direct wave (or "VHF radio wave beyond a line-of-sight distance"), receive data indicating a specific tendency are due to abnormal propagation such as frequency modulation or the like (including a series of these intermittent phenomena) through the spot-like or temporary abnormal reflection layer formed in the ionosphere or due to plasma density distribution abnormality, and formation of the reflection layer and properties thereof are closely associated with diastrophism such as an earthquake. Also, it was found that receive data exactly reflects such a fact. Thus, analysis of receive data on the reflection radio wave permits a position of occurrence of diastrophism such as an earthquake, a scale thereof, time thereof and the like to be judged.

The present invention permits the receive data on the reflection radio wave to be collected using at least a commercially available ordinary FM receiving unit (including an FM tuner and a center tuning meter) for receiving an FM broadcasting radio wave in a VHF radio wave band and an output unit connected to the center tuning meter and without requiring any specific receiving unit and analysis equipment.

A receive set frequency of the center tuning meter is rendered somewhat different from a VHF transmit frequency to be received, to thereby detect a variation in plasma density by means of frequency modulation of a transmit radio wave. The receive frequency modulation is recorded with time on, for example, a recording chart sheet of a pen recorder connected to the center tuning meter, so that time of occurrence of disturbance of the receive echo, magnitude/density thereof, a variation in receive voltage value thereof, a duration thereof and the like are read, to thereby permit occurrence of diastrophism between the receiving station and the VHF radio wave transmitting station, a scale thereof, time thereof and the like to be judged.

Detection of the above-described receive frequency modulation and display thereof may be carried out by means of an output unit other than the pen recorder, such as an electronic image unit like a cathode ray tube (CRT) and the like. Also, the judgment may be likewise carried out by subjecting the receive data to computer processing to output the data in the form of digital data, a symbol, a graph or the like and then reading the data.

It was elucidated that interruption of receiving of the above-described reflection VHF radio wave or properties thereof depend on a position of the plasma density distribution abnormality zone in the ionosphere and density thereof or non-uniformity/dispersion of charged particles such as ions, electrons and the like in the reflection layer and there exists a fixed pattern in a manner of disturbance of a receiving state thereof. Thus, reading of the pattern permits occurrence/extinguishing of the plasma density distribution abnormality zone in the ionosphere or properties/variation thereof to be analyzed.

It would be considered that occurrence of the plasma density distribution abnormality zone in the ionosphere is also due to a natural phenomenon such as inrush of meteor or the like into the atmosphere, activation of solar activity, or the like. However, it is exactly a temporary phenomenon such as meteor and is not affected by solar activity wherein intensity of reflection alternates depending on night and day. Thus, it is considered that the abnormal propagation phenomenon wherein predetermined reflection properties continue over several days irrespective of night and day exactly occurs only by affection of energy due to diastrophism below the plasma density distribution abnormality zone.

In view of the foregoing, the inventor analyzed all earthquakes occurring in the whole of Japan for the past two years and receive data before and after the earthquakes in order to study correlation between diastrophism and receive data by abnormal propagation of a VHF radio wave. As a result, it was proved that there is direct and constant relationship between both. Thus, the inventor developed a judgment method based on such receive data.

More particularly, when a receiving station remote by a distance sufficient not to permit it to receive a direct wave from a VHF radio wave transmitting station which transmits a radio wave of a predetermined frequency (for example, by a distance as long as about 400 km at a transmit output of 5 kw) fails to receive any abnormal reflection radio wave through the ionosphere, a receive voltage value is at a normal level, so that an output unit such as, for example, a pen of a pen recorder continues to describe a single straight line on a base level of a predetermined base line. There is seen no omen of diastrophism between the VHF radio wave transmitting station and the receiving station while the normal receive voltage value continues.

Then, when a relatively weak crust energy is released or a weak earthquake as small as about 3 to 4 in magnitude (hereinafter also referred to as "M") occurs in an area between the VHF transmitting station and the receiving station (a strip-like area of tens of kilometers in a lateral distance extending in parallel to a line defined by connecting both stations to each other), a variation in plasma density in the ionosphere is received from several days (2 to 5 days) before occurrence of the earthquake, wherein the receive frequency variation value is relatively slightly varied and, for example, the pen of the pen recorder constituting the output unit describes a characteristic wave profile out of the base level of the base line while describing an oscillatory wave profile bit by bit (waveform of FIG. 15(a)). (The wave will be hereinafter referred to as "earthquake omen wave".) A scale of the earthquake occurring thereafter can be accurately estimated on the basis of frequency of appearance of the "earthquake omen wave" and the thickness of the line recorded by the pen recorder representing the earthquake omen wave.

Also, in the "earthquake omen wave" state, when release of larger crust energy (a middle-scale earthquake of M5-6) occurs, a variation in plasma density of a higher frequency in the ionosphere is added from several days (3 to 6 days) before occurrence of the earthquake, leading to an increase in the thickness of the line recorded by the pen recorder representing the earthquake omen wave and frequency of appearance thereof (hereinafter referred to as "middle-scale earthquake omen wave") (waveform shown in FIG. 15(b)).

Further, when release of crust energy larger than the "middle-scale earthquake omen wave" (a huge earthquake of M8 or more) occurs, a variation in plasma density of a higher frequency in the ionosphere is added from several days (3 to 6 days) before occurrence of the earthquake, leading to a white noise state by waveform synthesis, resulting in the base line being thickened (hereinafter referred to as "large-scale earthquake omen base line width abnormality") (waveform of FIG. 15(c)).

Furthermore, even when a seismic center or hypocenter of a huge earthquake of M6 or more is far away as compared with the transmitting station based on the VHF receiving station, a variation in plasma density in the ionosphere causes the receive frequency to be likewise substantially varied from several days (3 to 6 days) before occurrence of the earthquake, so that a variation in plasma density of a higher frequency in the ionosphere is added, leading to waveform synthesis to form a white noise state, resulting in the base line being highly thickened, so that large-scale earthquake omen base line width abnormality is described. In this instance, a detectable range is in a direction of the transmitting station covering the receiving station, resulting in having an elongated elliptic shape far beyond the transmitting station. Whereas, a detectable region including the receiving station in a direction opposite to the transmitting station is varied depending on an output of a VHF radio wave transmitted.

In general, when a distance between the receiving station and the transmitting station is highly increased, specifying of an earthquake region is reduced in accuracy. However, a detectable distance is also varied depending on electric field strength of a radio wave outputted from the transmitting station.

Moreover, the present invention may be so constructed that the VHF radio wave transmitting stations and receiving stations are dispersively arranged in relationship of a plurality of pairs at suitable intervals in a region to be detected and/or a region including a periphery thereof, other than in relationship of one pair, to thereby form a receiving network set so as to permit each of the receiving stations to share at least one of the transmitting stations with any of the other receiving stations, leading to comparison between receive data at the respective receiving stations, resulting in permitting a region of diastrophism to be more accurately specified.

Now, the present invention will be more detailedly described hereinafter in connection with embodiments thereof. However, the present invention is not limited to the embodiments. The present invention includes any variations and modifications ordinarily made by those skilled in the art.

DETAILED DESCRIPTION OF THE PREFERRED EMBODIMENT

Figure 1:
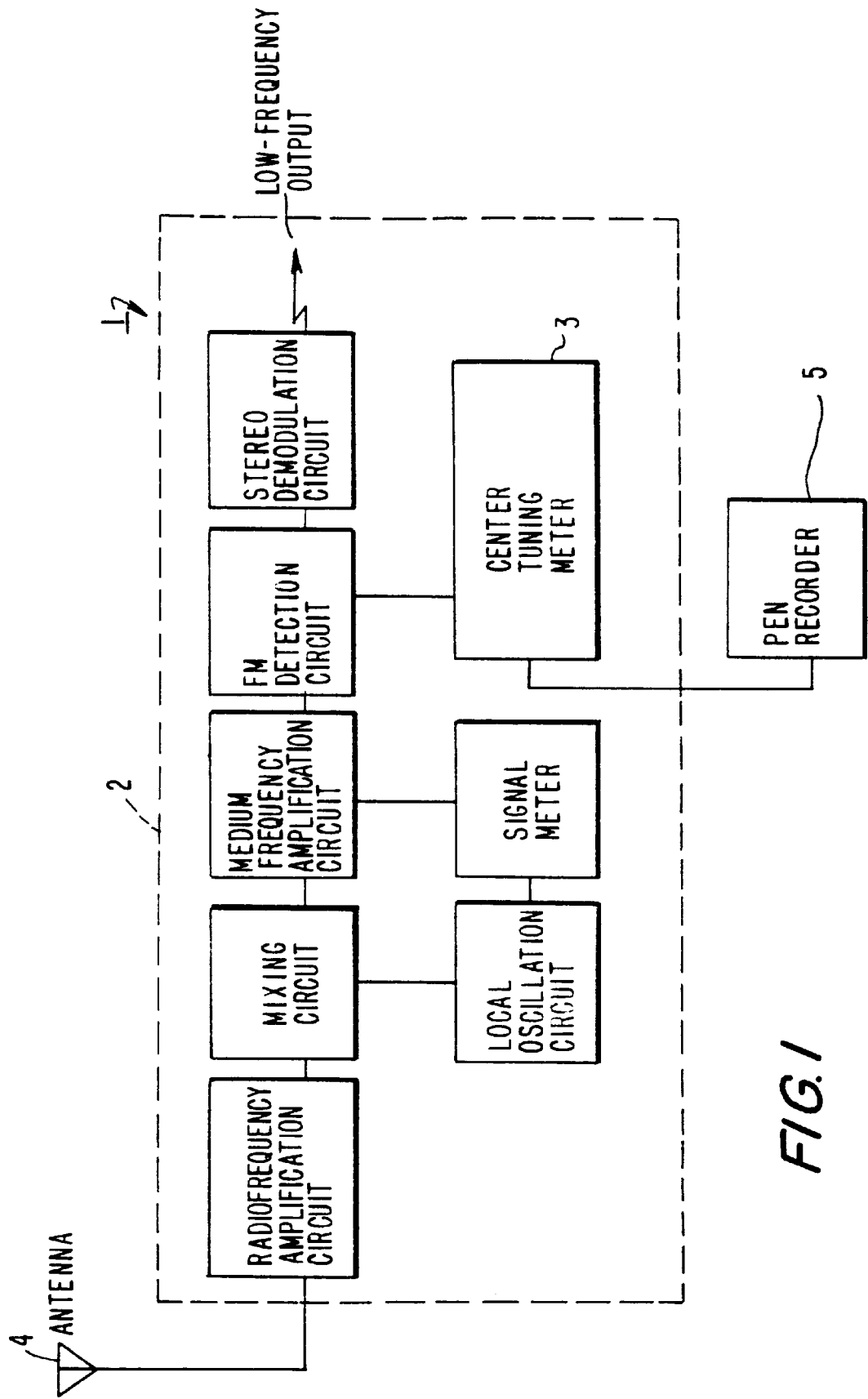
FIG. 1 is a block diagram showing an embodiment of a receiving unit used in a detection method according to the present invention.

Referring first to FIG. 1, a receiving unit 1 for a VHF radio wave used in a detection method of the present invention is illustrated. The receiving unit 1 includes a commercially available FM tuner 2 having a center tuning meter 3 for outputting, in the form of a voltage value, a frequency modulation value in a specific frequency domain of a VHF radio wave and a frequency shift domain thereof, as well as an antenna 4. Reference numeral 5 designates a pen recorder connected to the center tuning meter 3 so as to act as an output unit.

Figure 2:
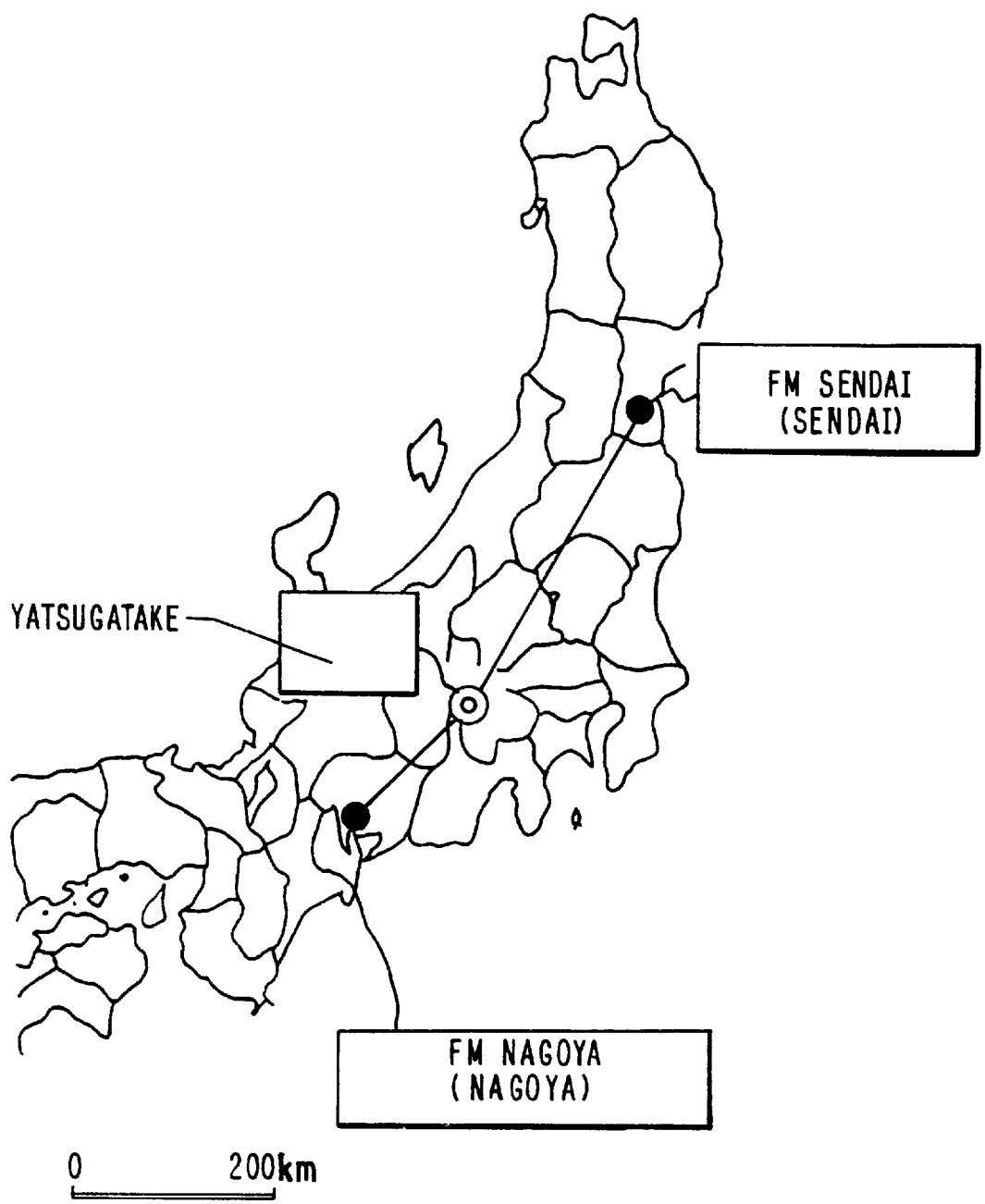
FIG. 2 is a fragmentary map of Japan showing an embodiment of positional relationship between a receiving station and an FM broadcasting station.

A receiving station equipped with the receiving unit 1 and pen recorder 5 was established at a foot of a southern slope of Yatsugatake indicated at ◎ in FIG. 2 (the site of an astronomical observatory owned by the inventor) and FM Sendai (indicated at ●) was selected as a transmitting station (an FM broadcasting station) for continuously transmitting a VHF radio wave of a predetermined frequency. Positional relationship between the receiving station and the transmitting station was determined so as to permit a radio wave transmitted from the broadcasting station to be received in a receiving station of a VHF radio wave beyond a line-of-sight distance, i.e., the receiving station only in the case of abnormal propagation from a plasma density distribution abnormality zone in the ionosphere.

The receiving unit 1 and the pen recorder 5 acting as an output unit which are arranged in the above-described receiving station, as well as details of a content transmitted from the FM broadcasting station are as follows:

1. Predetermined conditions of FM broadcasting station:

| | Name of broadcasting station | Site | Separation distance | Transmit frequency | Output |
|---|---|---|---|---|---|
| Main station | ① FM Sendai | Sendai city | about 500 km | 77.1 MHz | 5.00 kW |

An example of a neighboring station which affects only meteoric echo is as follows:

| | ② FM Nagoya | Nagoya city | about 200 km | 77.8 MHz | 10.00 kW |
|---|---|---|---|---|---|

2. Conditions for receiving:
Receive set frequency: 77.2 MHz
Receiving unit:
  FM tuner (FM STEREO TUNER TX-7600 manufactured by Pioneer Electronic Corp.)
  Zenith fixed 5-element Yagi antenna
Outputting unit: Pen recorder (Pen Recorder VP-6710A manufactured by Matsushita Electric Industrial Co., Ltd.)
Receive time zone:
  Receiving was continuously carried out from 0:30 am to 5:30 am every day. This is for the reason of eliminating affection of solar activity during the day time on the ionosphere and keeping the receiving station from directly receiving a direct wave of an FM radio wave (77.1 MHz) transmitted from the Broadcasting University which is near the receive set frequency.

The receiving conditions described above do not permit the receiving unit 1 to receive a direct wave transmitted from the FM Sendai station described above under an ordinary ionospheric environment. Whereas, when the plasma density distribution abnormality zone occurs in the ionosphere to cause a VHF radio wave to arrive at the receiving unit 1 from the Sendai station, the center tuning meter 3 fails to react to the wave at a predetermined transmit frequency and receives only a portion of frequency shift thereof within a receive allowable range, to thereby indicate receive echo corresponding to intensity of a receive voltage thereof.

More particularly, although the present invention utilizes an FM broadcasting radio wave, one of features of the present invention is to capture intensity of the receive voltage when it arrives at the receiving unit and frequency demodulation of the receive voltage to obtain data by keeping the receive set frequency from forcibly coinciding with a predetermined transmit frequency of the FM broadcasting radio wave and using a frequency in proximity thereto as an object to be received or a received object, resulting in observing existence of the plasma density distribution abnormality zone, properties thereof and a variation in behavior thereof or a variation in plasma density inversely on the basis of the data thus obtained.

Figure 3:
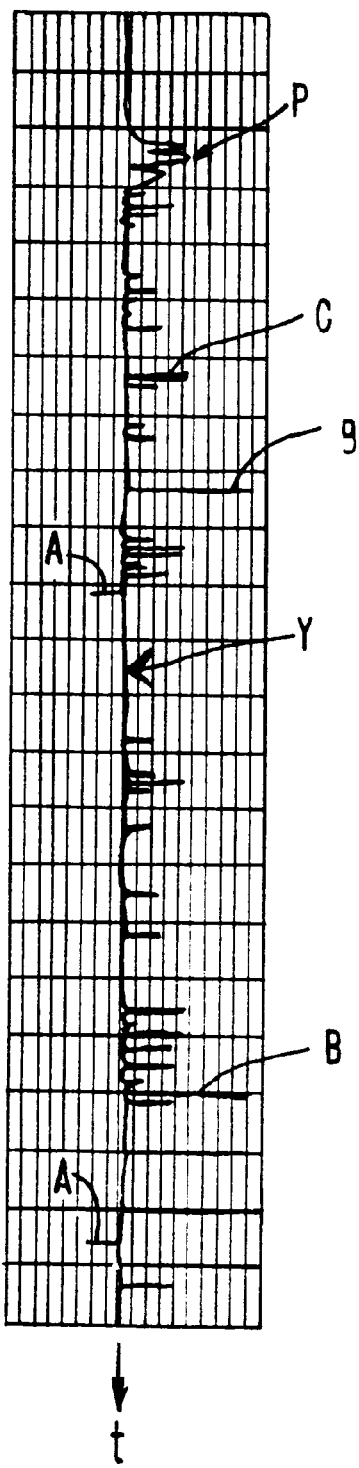
FIG. 3 is a chart of an output recorded on a pen recorder chart sheet which shows an example of meteor receive echo.

FIG. 3 shows a part of a data output of the receive echo which was recorded on a chart sheet of the pen recorder 5 on Jan. 4, 1994 under the above-described receiving conditions, when the ionosphere is in a normal state or the plasma density distribution abnormality zone does not occur.

In a state free from any receive echo that there is received abnormal propagation from none of the FM stations, a pen point of the pen recorder 5 describes a base line Y of a straight line parallel to a direction of movement of the chart sheet, to thereby indicate a base level (zero level).

Receive echo A recorded on a left-hand side of the base line Y indicates abnormal propagation echo of the FM Nagoya station which arrived at the receiving station by reflection on an ionospheric column formed due to inrush of meteor into the upper atmosphere between the receiving station and the FM Nagoya station. Receive echo B recorded on the right-hand side indicates that between the receiving station and the FM Sendai station. In either case, echo time is instantaneous and more particularly is less than one second.

Receive echo C recorded on both sides of the base line Y at the same time indicates abnormal propagation echo of an FM radio wave due to meteor. It is due to reflection of radio waves from both FM Sendai station and FM Nagoya station between which the receiving station is interposedly placed, therefore, it indicates abnormal propagation echo of each of the two broadcasting stations which arrived at the receiving station through reflection on an ionospheric column in the sky of the receiving station.

Receive echo P recorded in the form of a corrugation-like shape containing three projections contiguous to each other which occurred due to abnormal reflection on an airplane passing through the sky between the receiving station and the FM Sendai station. The echo extinguished in about two minutes.

Figure 4:
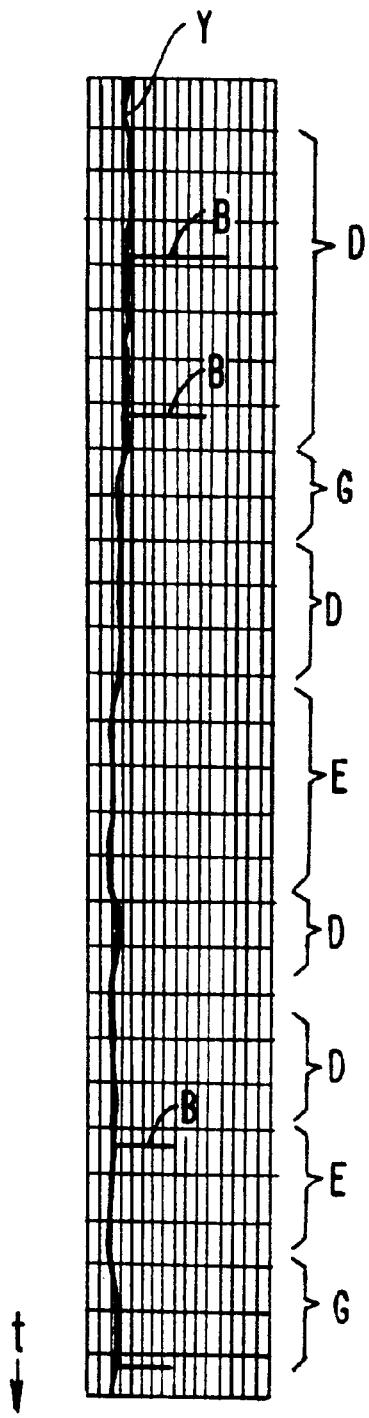
FIG. 4 is a chart of an output recorded on a pen recorder chart sheet which shows an example of receive data.
Figure 5:
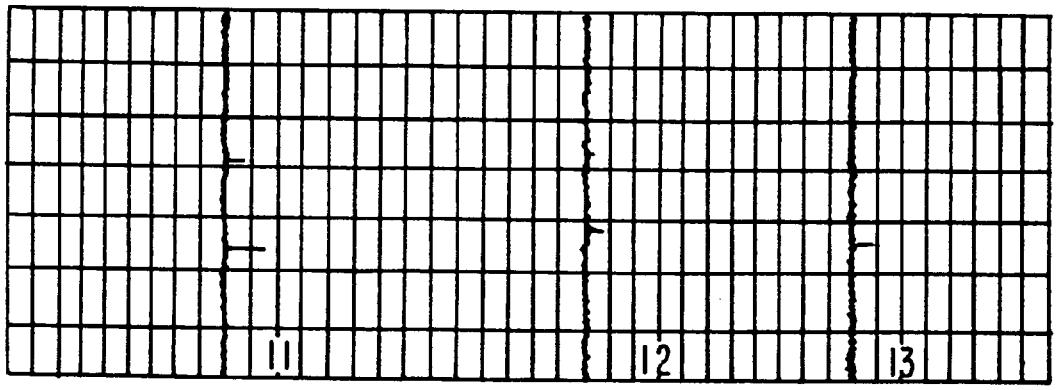
FIG. 5 is a chart of an output recorded on a pen recorder chart sheet which shows an example of receive data.
Figure 6:
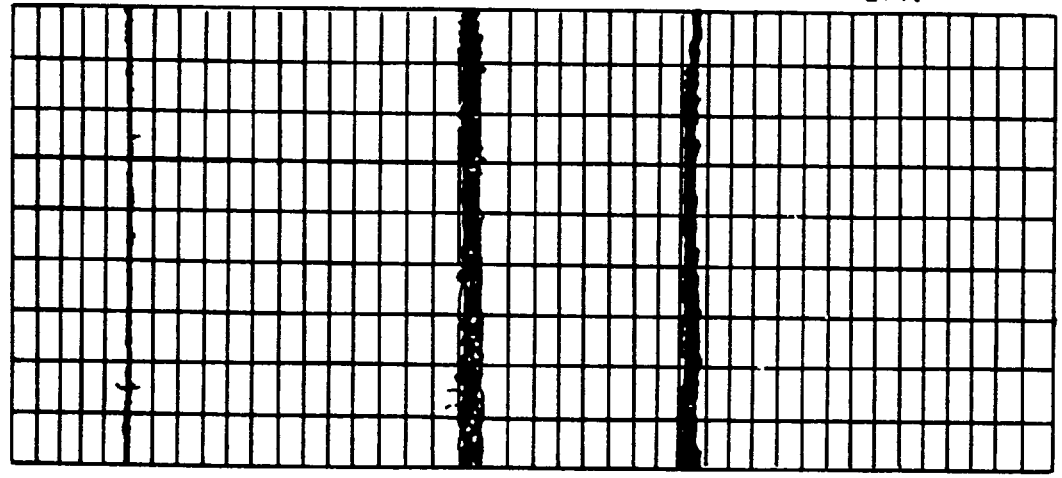
FIG. 6 is a chart of an output recorded on a pen recorder chart sheet which shows an example of receive data.

On the contrary, receive echo of each of FIGS. 4, 5 and 6 recorded under the same receiving conditions at different time indicates frequency modulation exhibiting properties or characteristics clearly different from those of such a temporary or transitory abnormal propagation phenomenon due to an airplane or meteor.

The receive echo shown in FIG. 4 is a part of records obtained during "a series of earthquakes in the sea near Izu Oshima Island" which occurred on Mar. 11 to 17, 1994, wherein a base line Y fails to describe a straight line and laterally meanders with a lapse of time t. This indicates frequency modulation of a radio wave from the Sendai station. Occurrence of such abnormality of the base line Y causes a frequency modulation waveform to intermittently appear for about 5 to 10 minutes. It often continues for an increased period of time as long as several days.

A variation in intensity of the base line Y is noted from instability of the base line Y as well. More particularly, a thickness of the base line is substantially unvaried in a straight state. However, it includes in addition thereto, a portion indicated at reference character E in FIG. 4 which corresponds to the "earthquake omen wave" described above, a portion indicated at G in FIG. 4 which corresponds to the "middle-scale earthquake omen wave" described above and a part of the portion G which is increased in amplitude and density, to thereby correspond to an increase in phenomenon of the "middle-scale earthquake omen wave". The part is indicated at reference character D in FIG. 4.

Such disturbance of the receive base line, a waveform thereof and an increase in width thereof as described above are due to a variation in modulation of the receive frequency over a long period of time. This is exactly caused by plasma density distribution abnormality occurring in the ionosphere in the sky between the receiving station and the FM broadcasting station. In other words, this reflects a variation in energy from the ground surface which is concerned with formation of the plasma density distribution abnormality zone and extinguishing thereof, as well as properties thereof, as described hereinafter.

Receive echo in each of records obtained on Jan. 12 and 13, 1995 which are shown in FIG. 5 and a record obtained on Jan. 14, 1995 which is shown in FIG. 6 densely records a variation in frequency which extends over a wide range corresponding to one third as large as a receive permissible range of the center tuning meter 3. This corresponds to a low level of the "large-scale earthquake omen base line width abnormality" described above, wherein a base line indicating a variation in frequency is substantially varied. It reflects feeding of stable and intensive charges from the ground surface which is concerned with formation of the plasma density distribution abnormal zone and extinguishing thereof, as well as properties thereof, as described hereinafter.

Receive echo in each of records obtained in Jan. 15 and 16, 1995 densely records, over an increased period of time, receive frequency shift extending over a range at least one half as large as the receive permissible range of the center tuning meter 3. It corresponds to a high level of the "large-scale earthquake omen base line abnormality" described above and indicates that a plasma density variation value is abnormally increased, leading to addition of a plasma density variation of a higher frequency.

In other words, it reflects further feeding of stable and large energy from the ground surface which is concerned with formation of the abnormal reflection layer and extinguishing thereof, as well as properties thereof, as described hereinafter.

Figure 7:
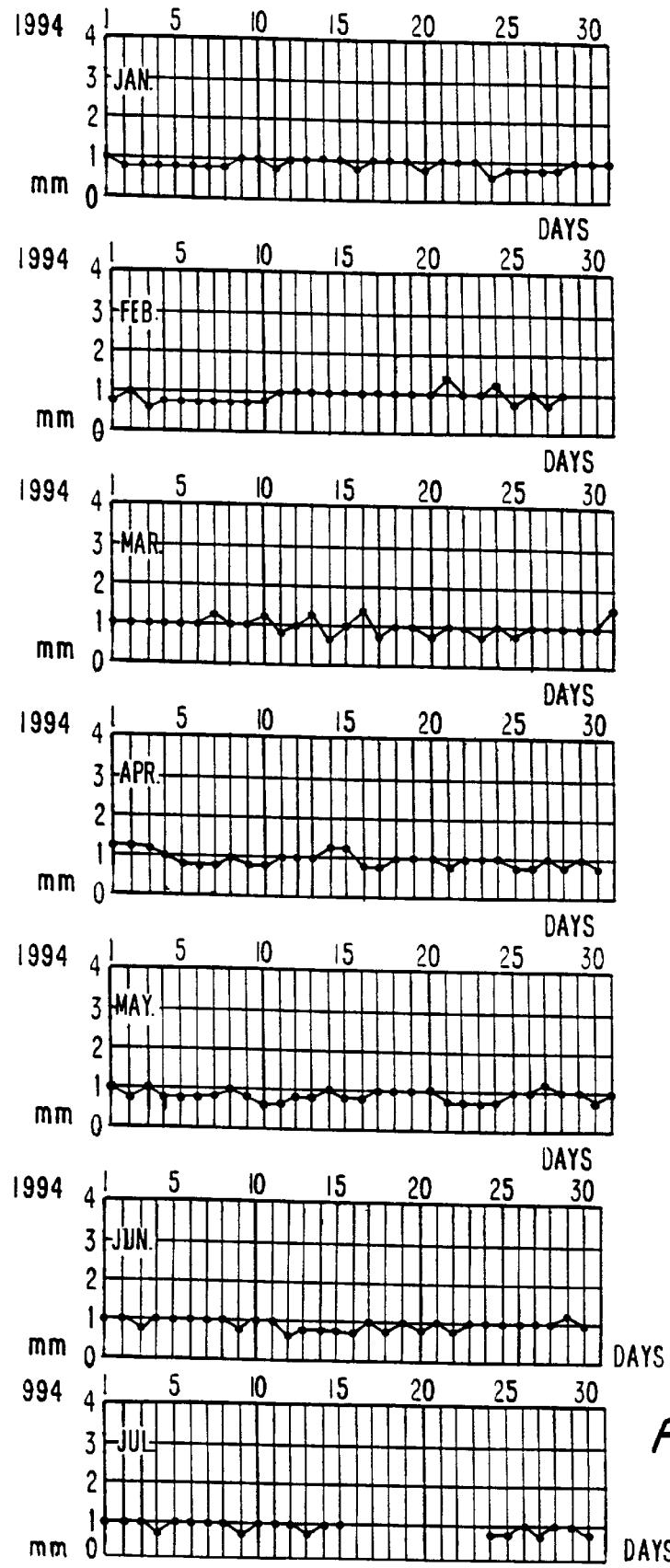
FIG. 7 is a graphical representation showing an annual change of base line width abnormality.
Figure 8:
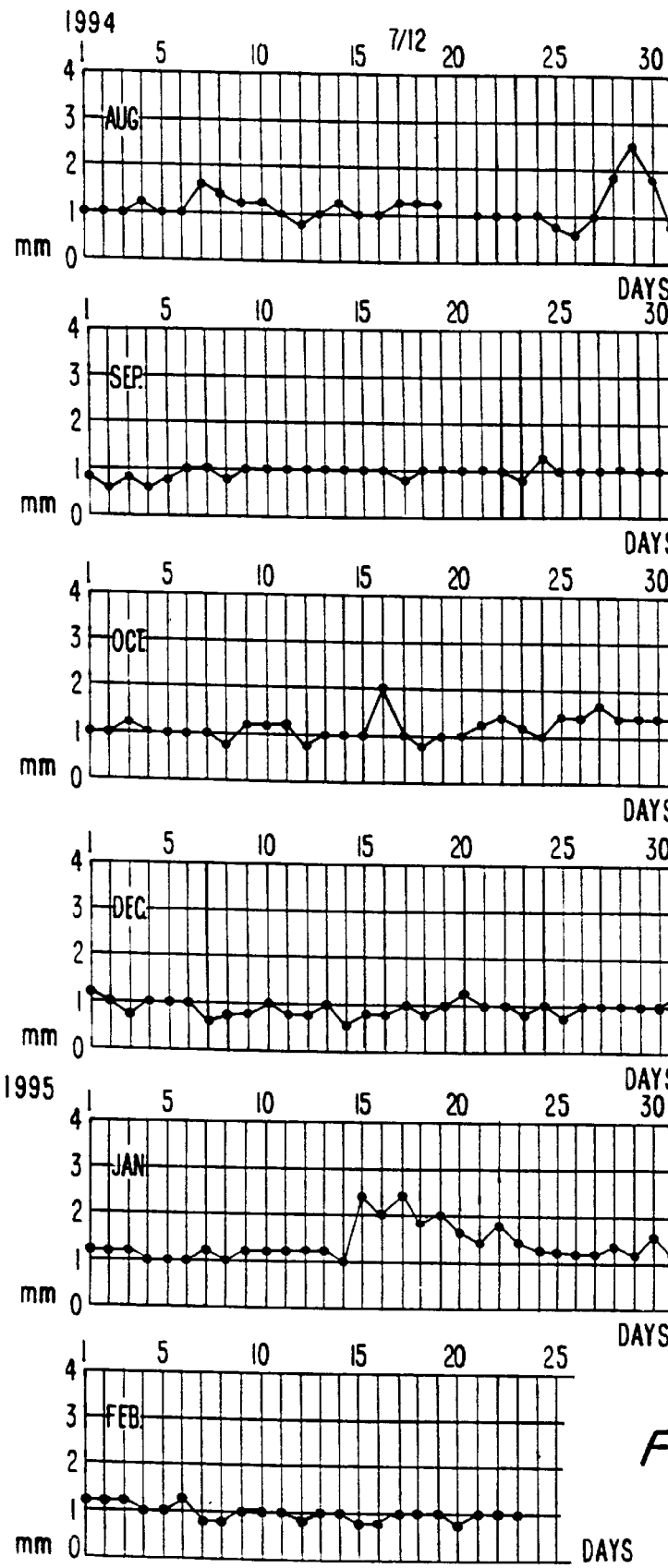
FIG. 8 is a graphical representation showing an annual change of base line width anomaly.

Of the above-described data thus observed, those obtained between Jan. 1, 1994 and Feb. 24, 1995 each were subject to plotting of a maximum value of the base line width obtained every day. The results were as shown in FIGS. 7 and 8. The Sendai Broadcasting Station was used as an FM broadcasting station concerned with the receive. In each of FIGS. 7 and 8, an axis of ordinates indicates a base line width (mm) and an axis of abscissas indicates a date.

It is noted that there is an exact correlation between the receive data and earthquakes actually occurring. More particularly, the following noticeable indications were found:

(1) Disturbance continuously appearing during the middle third of March, 1994 corresponds to a series of earthquakes in the sea near Izu Oshima Island. This was recorded as a "middle-scale earthquake omen wave".

(2) When a peak of 1.2 mm in base line width (earthquake omen wave) was recorded on Jun. 29, 1994, an earthquake of M5.2 occurred at 11:01 on the same day in the south part of Chiba-prefecture.

(3) When a peak of 2.5 mm in base line width (large-scale earthquake omen base-line width abnormality) was recorded on Aug. 29, 1994, an earthquake of M6.3 occurred at 03:27 on the same day in the Kurile Islands.

Also, an earthquake of M6.5 occurred at 18:07 on the same day near Kunashir Island.

(4) When a peak of 2.0 mm in base line width (large-scale earthquake omen base-line width abnormality) was recorded on Oct. 16, 1994, an earthquake of M6.9 occurred at 14:30 on the same day in the Etorofu Island.

(5) When a peak of 2.5 mm in base line width (large-scale earthquake omen base-line width abnormality) was recorded on Jan. 15 and 17, 1995, an earthquake of M7.0 to M7.6 occurred at 05:45 on Jan. 17, 1995 in the south part of Hyogo-prefecture.

In some cases, any noticeable receive echo was not found in connection with the large-scale earthquakes actually occurred. For example, the earthquakes are as follows:

Earthquakes of M8.1 and M7.3 occurring off the coast of the east of Hokkaido on Oct. 4 and 9, 1994;

An earthquake of M5.1 occurring off the coast of Miyagi-prefecture on Dec. 10, 1994; and An earthquake of M7.5 occurring far off the coast of Sanriku on Dec. 28, 1994.

The cause would be that a seismic center or hypocenter of each of these earthquakes is in a sea trench or ocean deep, so that a variation in plasma density in the ionosphere occurs in a part of the upper atmosphere of a distance far sufficiently not to permit a radio wave outputted from the FM Sendai station to be captured as a reflected wave. However, the present invention effectively detects an omen of a large-scale earthquake (M6 or more) in an ocean plate as described hereinafter, even when it is of the trench type.

Figure 9:
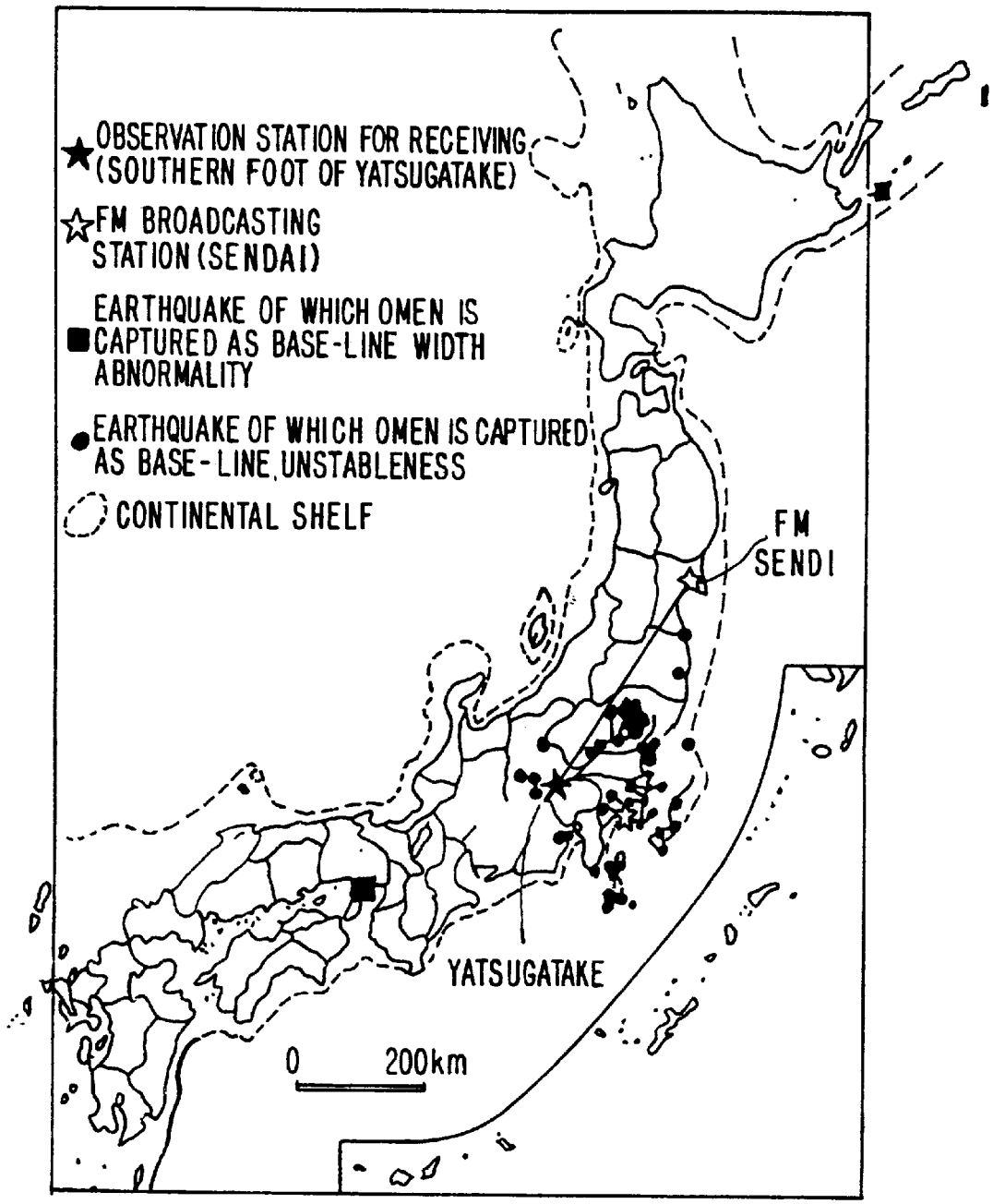
FIG. 9 is a diagrammatic view showing earthquakes which actually occurred in Japan in 1994 and of which an omen was observed by the present invention.

Further, frequency modulation was recorded at a level of "earthquake omen wave" between January, 1994 and December, 1994. Also, relationship between the records and sensible earthquakes actually occurring just after the records was studied. As a result, earthquakes which could be predicted by the present invention are shown in FIG. 9 which is a map of Japan. (Data were obtained from "Sensible Earthquakes-Earthquake Volcano Outlook" issued by the Earthquake Volcano Section, the Meteorological Agency.)

As a result, it was found that receive data captured at a level of "earthquake omen wave" at Yatsugatake (★) at which the receiving station is established are at left- and right-hand outer edges of a line defined by connecting Sendai and the receiving station to each other and are concentrated within a range captured by a directivity of a Yagi antenna. A front of the zenith-fixed Yagi antenna set in the receiving station is orientated to the east based on the southern foot of Yatsugatake.

Also, a huge earthquake occasionally arrives at the receiving station depending on a range of formation of a plasma density distribution abnormality zone or properties thereof in the ionosphere affected by the earthquake, even when it occurs out of the territory. Thus, the present invention could predict an omen of each of the large-scale earthquakes occurred in the south part of Hyogo-prefecture and Kurile islands and near Kunashir as described above. Thus, the present invention can predict an omen of an earthquake of M3 or more occurring in the territory and an omen of an earthquake of M6 or more occurring out of the territory.

Figure 10:
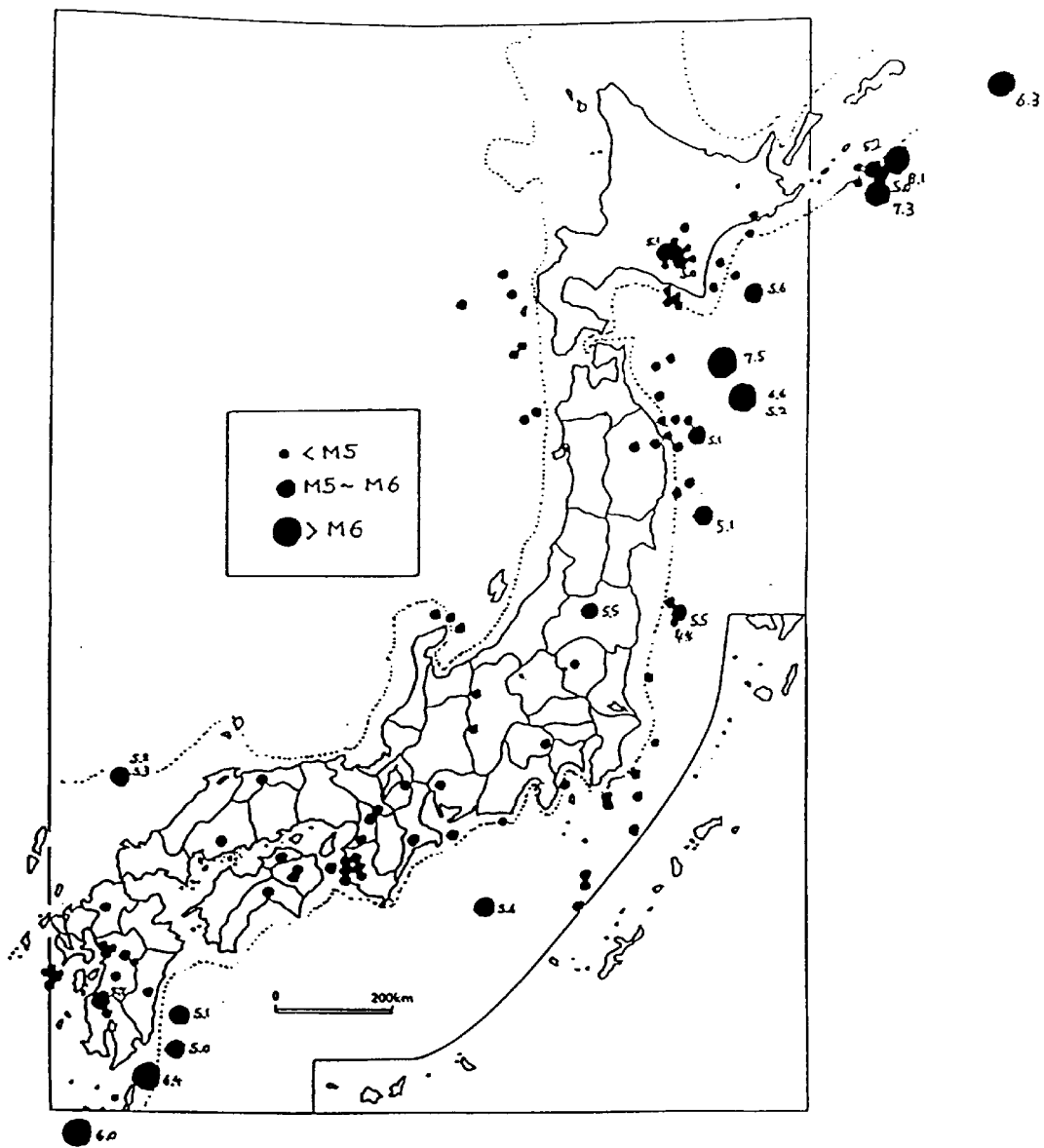
FIG. 10 is a diagrammatic view showing earthquakes which actually occurred in Japan in 1994 and of which an omen was not observed by the present invention.

FIG. 10 is based on the same materials as FIG. 9 and shows data on sensible earthquakes which could not be detected at any level of from "earthquake omen wave" to "large-scale earthquake omen base-line width abnormality" by the present invention.

It will be noted from FIG. 10 that the earthquakes which could not be detected by the present invention are substantially out of the detectable territory of the present invention. Also, some of the earthquakes occurring in the territory could not be detected, however, a ratio which the non-detected earthquakes account for in all earthquakes is very slight. One of the reasons is that there were not collected any receive data in a part of each of July and August and in October of a data collection period due to a deterioration in observation accuracy owing to any trouble or failure of the receiving unit.

The inventor carried out a restrictive open test while restrictively using only "scale" of an earthquake, "time of occurrence" thereof and "range of place of occurrence " thereof as prediction information in order to more objectively prove the advantages of the present invention. For this purpose, a practical test for earthquake prediction was executed using the detection method and apparatus of the present invention, as follows:

Period of execution:
  Between Feb. 28, 1995 and Apr. 6, 1995
Source of presentation of information:
  ① NHK Kofu Broadcasting Station
  ② Yamanashi Nichi-nichi Shinbun-sha
  ③ Yomiuri Shinbun-sha
Prediction area:
  Whole district of the Kanto area, Yamanashi-prefecture, the east part of Shizuoka-prefecture, a part of Niigata-prefecture, Izu Islands
Observation site:
  Astronomical observatory at the south foot of Yatsugatake (Oizumi-mura, Yamanashi-prefecture)

In addition to the conclusive open data described above, such conditions for the FM broadcasting station and receiving conditions as described above were set as condition for a detection procedure in the practical test.

Correlation between the prediction information provided in the open practical test and earthquakes actually occurring is shown in the following table.

Earthquakes occurring in the prediction areas and therearound and in the prediction period were detected as one omen as a whole.

Further, the prediction was reported to the information providers by 7 o'clock in the morning on a day of announcement via a fax.

| Announce-ment Date | Contents of Prediction | | Results in Prediction Areas |
|---|---|---|---|
| 2/28 | Prediction days: 3/1–3/4 Scale: M3 | 3/1 | off the south of Izu Peninsula M3.1, M3.4 |
| | | 3/2 | the Bay of Tokyo M3.4 |
| | | 3/3 | the sea of Kashima M4.0 |
| 3/08 | Prediction days: 3/09–3/12 Scale: M3–M4 | 3/10 | the north part of Chiba-prefecture M4.2 |
| 3/11 | Prediction days: 3/11–3/15 Scale: M3 | 3/12 | Kanagawa-prefecture M3.3 |
| | | 3/12 | off the coast of the east of Chiba-prefecture M4.7 |
| 3/18 | Prediction days: 3/18–3/21 Scale: M3 | 3/19 | the middle part of Kanagawa-prefecture M3.3 |
| 3/22 | Prediction days: 3/22–3/25 Scale: M3 | 3/23 | the west part of Ibaraki-prefecture M4.6 |
| 3/25 | Prediction days: 3/25–3/28 Scale: M3–M4 | 3/28 | off the east of Izu Peninsula M4.0 |
| 3/29 | Prediction days: 3/29–4/01 Scale: M4–M5 | 4/1 | the north part of Niigata-prefecture M6.0 |
| 4/02 | Prediction days: 4/02–4/04 Scale: M4–M5 | 4/3 | the north part of Niigata-prefecture M5.0, M3.9 |
| 4/03 | Prediction days: 4/03–4/06 Scale: M4–M5 | 4/5 | the north part of Niigata-prefecture M4.8, M4.7 the north part of Chiba-prefecture M3.8 |

During the period of the practical test, there was found no fact that any earthquake of M3.0 or more other than the above occurred in the prediction areas. Thus, it will be noted that the present invention was proved to substantially exactly and accurately predict all the earthquakes actually occurring, as well as the time and-scale thereof.

The open practial test was concurrently carried out with respect to a plurality of the public information media described above, and both collation between the prediction and actual occurrence of the earthquakes and confirmation thereof were objectively ensured by certificates issued from the information media.

Also, positional relationship between the receiving station and the FM broadcasting station fully failed to permit an omen of each of earthquakes occurring in areas indicated below out of the receive territory in which a VHF radio wave is received on the basis of the plasma density distribution abnormality zone in the ionosphere to be captured.

| Date | Place and Scale | Date | Place and Scale |
|---|---|---|---|
| 3/01 | Hokkaido S*1 | 3/02 | Ofunato S2 |
| 3/02 | Osaka Bay M3.7 | 3/04 | Tohoku area (Miyako, Morioka) S1 |
| 3/05 | Osaka Bay M2.8 | 3/06 | Hokkaido (Nemuro) S1 |
| 3/07 | The west part of Nagano-prefecture M3.6 | 3/08 | Kyoto S1 |
| 3/09 | Oita-prefecture S1 | 3/10 | The Sea of Okhotsk M6.2 |

-continued

| Date | Place and Scale | Date | Place and Scale |
|---|---|---|---|
| 3/11 | Off the coast of Iwate-prefecture M4.8 | 3/12 | Nemuro S2 |
| 3/16 | Iida, Nagano-prefecture S2 | 3/17 | The west part of Nagano-prefecture M6.2 |
| 3/16 | Off the coast of the east of Tottori-prefecture M4.6 | 3/22 | Aomori-prefecture (Hachinohe) S1 |

S*indicates a seismic scale.

Before and after occurrence of the earthquakes, the receiving unit did not record any abnormal propagation of a VHF radio wave. Thus, it will be noted that the scale of each of the earthquakes failed to permit formation of a plasma density distribution abnormality zone sufficient to extend over the sky between the receiving station and the FM station.

Figure 12A:
FIG. 12 is a chart of an output recorded on a pen recorder chart sheet which shows an example of receive data in an ocean plate type earthquake.

Now, detection of an omen of a large-scale earthquake (M6 or more) in an ocean plate will be described hereinafter with reference to FIG. 12. In this instance as well, the detection was carried out using a VHF radio wave and the receiving unit 1 shown in FIG. 1, as in the above-described detection of an earthquake of which a seismic center is in the land. Also, the detection used a transmitting station increased in output which is spaced by thousands of kilometers from the receiving station so that a variation in plasma at a higher altitude may be captured. In this instance, an indication by the pen recorder was carried out so that a base line is substantially straight at a normal level as shown in FIG. 12(a). On the contrary, in a plate-type submarine earthquake, a characteristic waveform of a reduced cycle (as short as about 60 seconds) was obtained from several day (4 to 8 days) before the plate-type submarine earthquake. The wave was observed on Oct. 11, 1995 and thereafter an earthquake of M6.7 having a seismic center in a plate in the sea near the Philippines occurred in the sea near Amami Oshima Island on Oct. 18, 1995. However, an omen wave of the earthquake was not observed by the receiving unit of which an object to be received is a radio wave from the transmitting station or the FM Sendai Broadcasting Station for detecting an earthquake having a seismic center in the land.

Figure 12B:
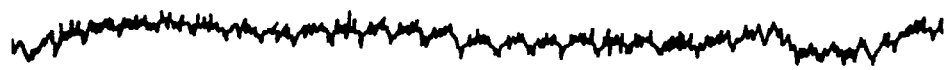

Thus, although a waveform shown in FIG. 12(b) is a specific waveform corresponding to an ocean plate-type earthquake, it permits an omen of such an earthquake to be detected as well. An ocean plate-type earthquake causes a plasma density distribution abnormality zone in the ionosphere to be highly wide, so that it is required to construct a detection network in a scale over thousands of kilometers to determine a seismic center region.

Figure 11:
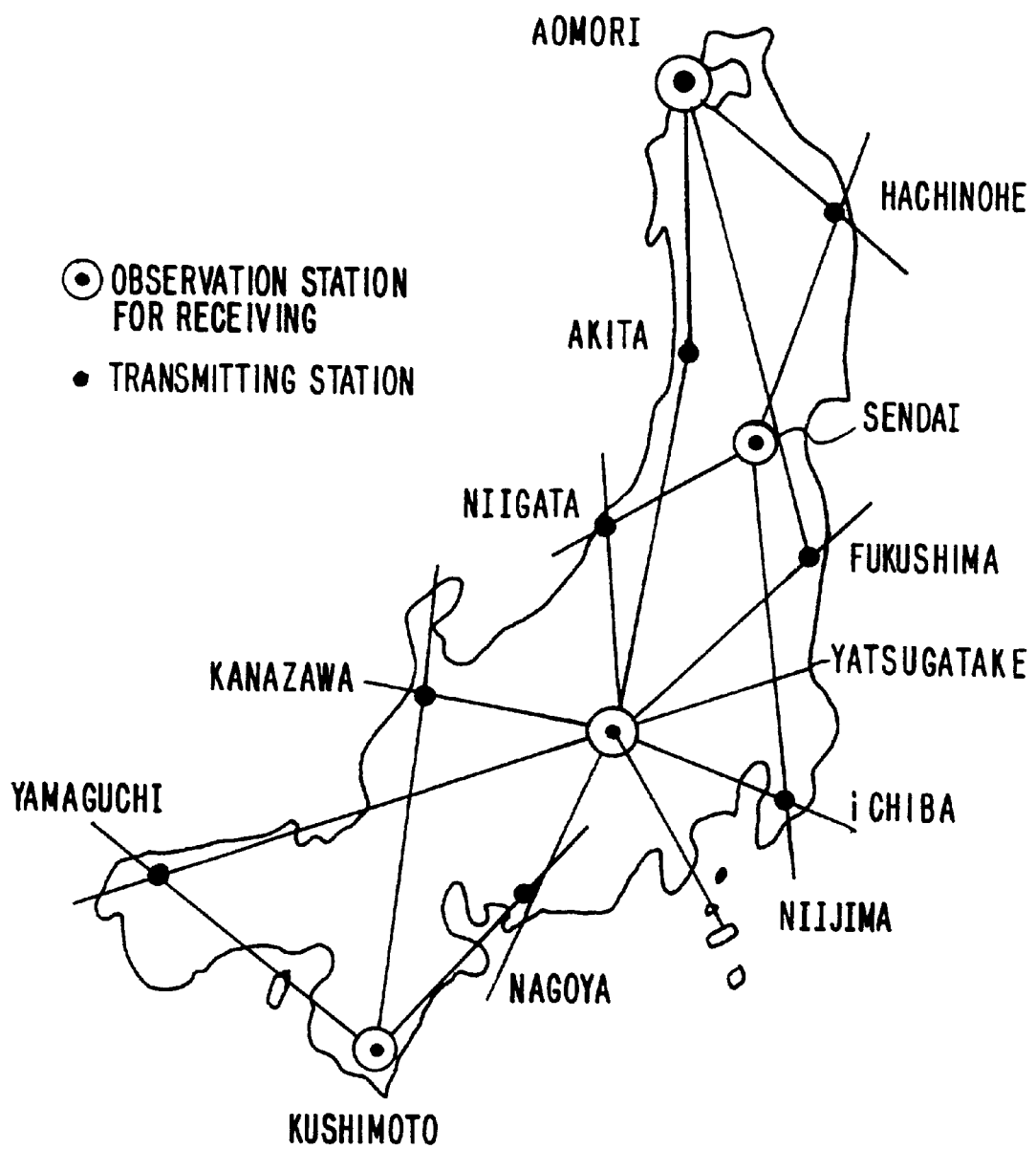
FIG. 11 is a diagrammatic view showing an embodiment of the present invention wherein the present invention is subject to network development.

FIG. 11 shows an embodiment of a detection method according to the present invention, wherein a plurality of VHF radio wave transmitting stations and a plurality of receiving stations are arranged to constitute a network wherein detection territories of a sector-like shape are formed between the receiving stations adjacent to each other in a manner to duplicate as much as possible. Such construction of the embodiment permits a site of occurrence of diastrophism over an increased area to be clearly specified and ensures an increase in accuracy of receive data, to thereby increase reliability of the detection.

Figure 13:
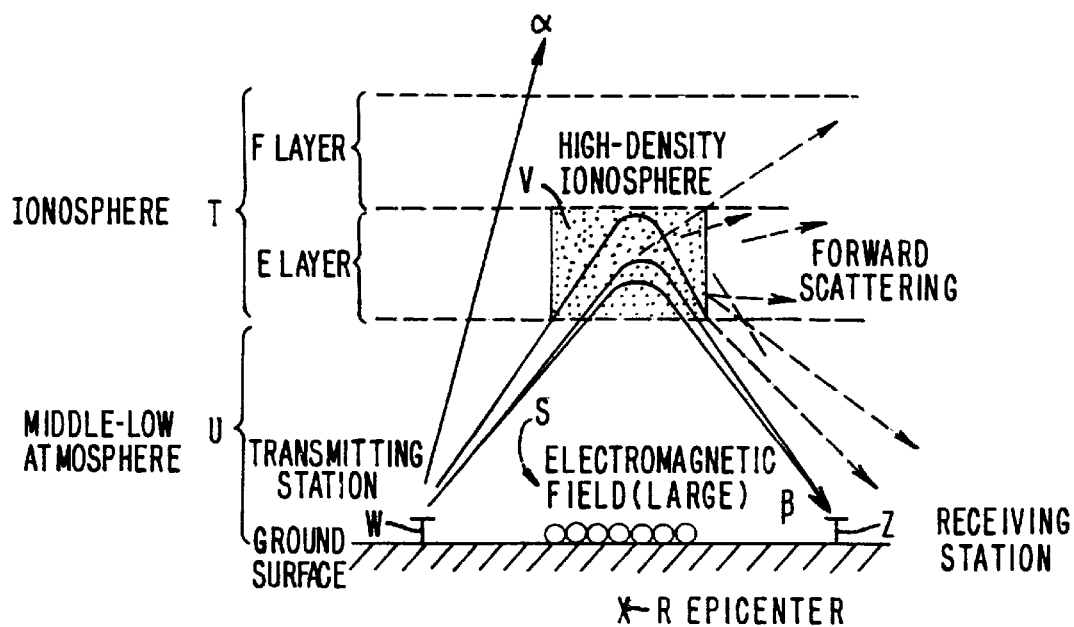
FIG. 13 is a schematic view showing an example of a mechanism of occurrence of a plasma density variation region.
Figure 14:
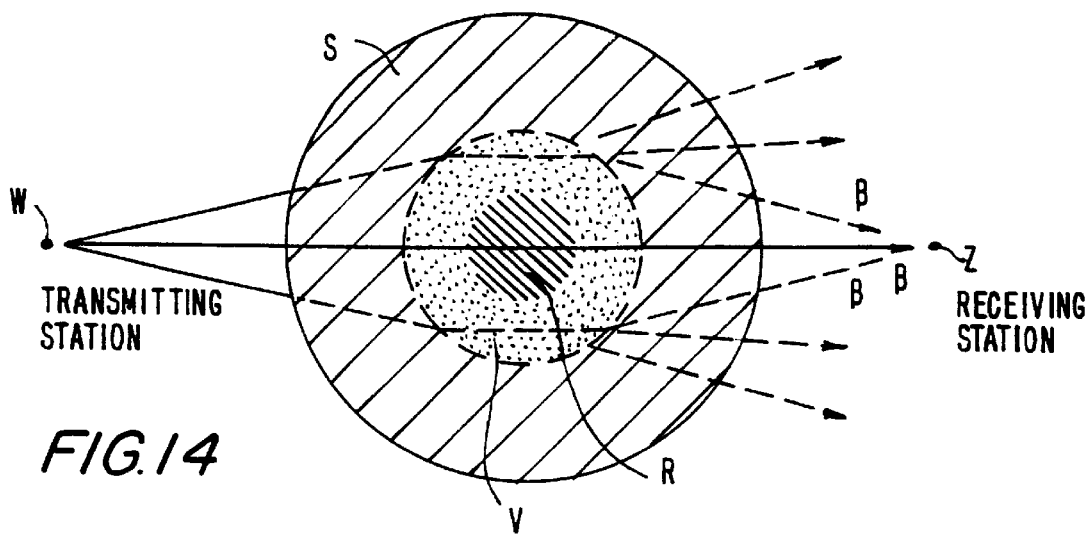
FIG. 14 is a plan view of the mechanism shown in FIG. 13.
Figure 15A:
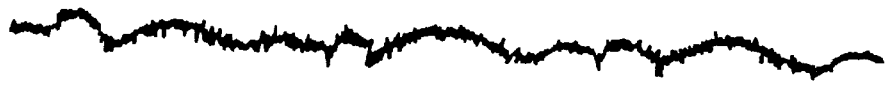
FIG. 15 is a view showing waveform models appearing on a pen recorder depending on a scale of an earthquake.
Figure 15B:
Figure 15C:

FIGS. 13 and 14 each schematically show the most possible theoretical causal relation of a correlation mechanism between crust energy occurring during diastrophism and an abnormal reflection layer (plasma density distribution abnormality zone) temporarily appearing in the ionosphere by affection of the crust energy.

Of phenomena called reflection of a radio wave, reflection on the ionosphere is a phenomenon of gradually refracting a radio wave depending on a gradient of plasma density in the ionosphere. Thus, a variation in index of refraction of a radio wave due to plasma density renders a reflection angle of the wave varied, unlike mirror reflection in which an incident angle and a reflection angle on a surface of solid or liquid are rendered equal to each other. Thus, it causes scattering of the wave and irregular reflection thereof, to thereby fail to fully ensure that all incident radio waves advance in the same direction.

It is known in the art that when an increased pressure is generated in a crust, an earth current and an electromagnetic wave, as well as an intensive electrostatic action based on a piezoelectric action due to friction of the crust and/or compression thereof are generated in the form of a large amount of energy from a circumference of a center of the crust (an epicenter R in an earthquake). Of charges generated by the electrostatic action, ones transferred to above the epicenter R are integrated on the ground surface about the epicenter, to thereby form an electrostatic field S of an increased area.

A normal ionosphere T constantly existing in the sky above the ground surface has free electrons and ion plasma already scattered therein. However, the above-described occurrence of the intensive electrostatic field S on the ground surface causes charges of a polarity reverse to that of the charges on the ground surface to be concentrated in an amount and density corresponding to those in the upper ionosphere T opposite to the electrostatic field S on the ground surface, with a middle and lower atmosphere U which acts as a non-conductor being interposed therebetween, so that a high-density ionosphere V having plasma density higher than a circumferential ionosphere is partially formed. This results in a huge capacitor structure being provided in the natural world.

Considering formation of such a capacitor model, such high-density concentration of plasma in the ionosphere in the sky spaced by hundreds of kilometers from the ground surface may be readily understood. More particularly, even when the electrostatic field V on the ground surface is microsized from a viewpoint of a global scale and/or the ionosphere is far from the ground surface, the capacitor ought to permit the corresponding electrostatic field S to be necessarily formed. Also, a scale of the electrostatic field S and a plasma density variation value results in a frequency of the VHF radio wave being shifted.

Under such a circumstance, a part of a radio wave generated from a VHF radio wave transmitting station W arrives at the ionosphere of ordinary density through the ionosphere T as indicated by an arrow α and another part of the radio wave arrives at the high-density ionosphere V. A part of the radio wave which thus arrived at the high-density ionosphere V is subject to complicated irregular reflection or scattering in the high-density ionosphere, to thereby be diffused in the forward sky and another part thereof is refracted in the high-density ionosphere V, resulting in arriving at a receiving station Z on the ground, as indicated by an arrow β.

A frequency of the radio wave received at the receiving station Z placed at a position which does not permit the receiving station Z to receive a direct wave of a VHF radio wave indicates that the receiving station Z captures a part of the radio wave arriving at the station Z while being reflected in the plasma density abnormal zone V temporarily formed by affection of the diastrophism.

Also, a value indicated by the center tuning meter exactly corresponds to the amount of frequency shift of the reflected radio wave captured by the receiving unit or a variation in plasma density in the ionosphere.

Thus, the fact that the receiving station Z received an abnormal frequency modulation radio wave from the transmitting station W indicates that there exists an electrostatic field S on the opposite ground surface which causes the plasma density distribution abnormality zone to be formed in the ionosphere in the sky between the transmitting station W and the receiving station Z or there is accumulated diastrophism energy sufficient to cause an earthquake or the like in the ground in the vicinity of the ground surface.

Contrary to the capacitor model concept described above, a concept that plasma is formed in the ionosphere due to particles of high energy such as an electromagnetic wave, an X-ray and the like emitted from an interior of a crust, to thereby cause abnormal reflection of a VHF radio wave would be considered. However, such a concept would not be accepted in view of energy damping by a distance between the ground surface and the ionosphere. Likewise, the distance does not permit noise energy from any artificial facilities to reach the ionosphere. Further, it would not be likewise considered that a phenomenon of forming an abnormal reflection layer in any specific place of the ionosphere due to any natural phenomenon such as solar activity, meteor or the like accidentally overlaps all the actual earthquake regions described above.

In this regard, an object of the present invention is not to theoretically elucidate any physical relationship between any energy or the like due to diastrophism and any abnormality in the ionosphere. The present invention is to positively elucidate any correlation between time of occurrence and extinguishing of diastrophism, a position thereof, properties thereof and a scale thereof as a resultant phenomenon and plasma density distribution abnormality occurring in the ionosphere and accomplish detection and judgement of the diastrophism utilizing such a natural phenomenon.

INDUSTRIAL APPLICABILITY

The diastrophism detection method according to the present invention captures a VHF radio wave propagating through an abnormal reflection layer (plasma density distribution abnormality zone) formed in the ionosphere by receiving, to thereby accurately judge occurrence of diastrophism below the plasma density distribution abnormality zone, the amount of energy thereof, a degree of growth thereof, energy release time thereof and the like associated with formation of the plasma density distribution abnormality zone, properties thereof and a behavior thereof by a pattern analysis of the receive data.

Also, the present invention permits the receive data to be established as a qualitative and quantitative judge pattern based on relationship to a position of transmitting of a predetermined VHF radio wave and the plasma density distribution abnormality zone, so that the diastrophism may be accurately and readily predicted from viewpoints of the place, time and scale.

Thus, the present invention eliminates uncertainty and non-objectivity in accidental detection by visual observation, as well as a difficulty in discrimination between actual diastrophism and various noises caused artificially or by any natural phenomenon when energy on the ground surface or in the ground is measured by means of any electronic measuring equipment.

Further, the present invention permits time of activity releasing diastrophism energy such as occurrence of an earthquake to be predicted from several hours to three days and four to six days in an early case before actual occurrence of diastrophism, to thereby provide time sufficient to consider a countermeasure to an earthquake and eliminate advance evacuation over an excessively long period of time.

Furthermore, the present invention permits an FM receiving equipment, a pen recorder, a personal computer and the like which are commercially available to be used for detection in the present invention, to thereby accomplish cost savings.

Also, the receiving unit may be constructed in a movable or portable manner, so that a progress of diastrophism may be caught at real-time. Thus, countermeasure for each of evacuation and disaster prevention may be rapidly taken depending on various situations in various transport systems and facilities and individual lives.

In addition, spreading of a network constituted by transmitting and receiving stations all over the country permits a position of diastrophism to be more accurately predicted while being specified. In particular, formation of a combination network in which receiving stations adjacent to each other are so arranged that detection territories thereof overlap each other to cover the whole territory permits diastrophism to be positionally accurately specified and prevents wrong information.

Moreover, the diastrophism detection method of the present invention utilizes the ionosphere in the upper atmosphere surrounding the whole earth, to thereby be highly useful as a preceding prediction method for large-scale diastrophism such as an earthquake, a volcanic eruption or the like over the world, except abyssal diastrophism occurring far from the land.

The present invention exhibits unfathomable significance in view of the fact that many lives and estimates are lost by inland-type large-scale earthquakes and volcanic eruptions occurring in various parts of the world.

What is claimed is:

1. A method for detecting diastrophism comprising the steps of transmitting a VHF radio wave from a transmitting station into the ionosphere;

detecting the VHF radio wave at a receiving station located beyond a line-of-sight distance from said transmitting station, said detection of the VHF radio wave indicating a variation in plasma density occurring in a plasma density distribution zone in the ionosphere thereby resulting in abnormal propagation and reception of the VHF radio wave upon reflection from said ionosphere; and determining that the plasma density distribution zone was created by diastrophism below the plasma density distribution zone by detecting the VHF radio wave continuously, at least intermittently, for at least about five minutes.

2. The method as claimed in claim 1, further comprising the step of setting a receive set frequency in a frequency shift domain which does not permit said receive set frequency to coincide with a frequency of said VHF radio to thereby detect a frequency modulation of the transmitted wave resulting from a variation in the plasma density.

3. The method as claimed in claim 2, further comprising the step of outputting the data representing abnormal propagation of said VHF radio waves in the form of a variation in base-line voltage value in a pen recorder connected to a receiving unit.

4. The method as claimed in claim 2, further comprising the steps of analyzing the data representing abnormal propagation of said VHF radio waves with a computer connected to a receiving unit; said computer outputting results of the analysis in the form of an electrical signal and/or a character/symbol.

5. A method as defined in claim 2, further comprising the step of judging that release of crustal energy has occurred when abnormal propagation receive data of said VHF radio wave continuously appears for at least about 5 minutes and is intermittently received.

6. A method as defined in claim 2, further comprising the step of constructing means for judging a scale of diastrophism to judge on the basis of the magnitude of a variation in abnormal propagation receive data of said VHF radio wave and a frequency of appearance of said variation that an increase in said magnitude and said frequency indicates a possibility of occurrence of the release of large-scale crustal energy.

7. The method as claimed in claim 1, further comprising the step of outputting abnormal propagation receive data of said VHF radio wave in the form of a variation in base-line voltage value in a pen recorder connected to a receiving unit.

8. The method as claimed in claim 1, further comprising the steps of analyzing abnormal propagation receive data of said VHF radio wave with a computer connected to a receiving unit;

said computer outputting results to of the analysis in the form of an electrical signal.

9. The method as claimed in claim 1, further comprising the steps of dispersively arranging a plurality of VHF radio wave transmitting stations in manner to be spaced from each other at suitable intervals in a region in which diastrophism is to be detected and constructed so as to output radio waves different in frequency from each other; and dispersively arranging a plurality of VHF radio wave receiving stations so as to be spaced from each other at suitable intervals in a region in which diastrophism is to be detected and each are located at a position which does not permit each of said VHF radio wave receiving stations to receive even a direct wave from any of said VHF radio wave transmitting stations;

setting said VHF radio wave receiving stations to a receive set frequency in a frequency shift domain which does not permit said receive set frequency to coincide with a frequency of said VHF radio wave of at least one of said receiving stations and forming a receive network for permitting at least one of the transmitting stations concerned with to receive and to be coincided with a receive object in any of the other receiving stations in order to analyze receive data in the receiving stations while comparing the data with each other.

10. A method as defined in claim 1, further comprising the step of constructing means for judging a scale of diastrophism to judge on the basis of the magnitude of a variation in abnormal propagation receive data of said VHF radio wave and a frequency of appearance of said variation that an increase in said magnitude and said frequency indicates a possibility of occurrence of the release of large-scale crustal energy.

* * * * *